US012485068B2

(12) United States Patent
Abu Ahmad

(10) Patent No.: US 12,485,068 B2
(45) Date of Patent: Dec. 2, 2025

(54) PILL'S CELL

(71) Applicant: Bahaa Abu Ahmad, Reine (IL)

(72) Inventor: Bahaa Abu Ahmad, Reine (IL)

( * ) Notice: Subject to any disclaimer, the term of this patent is extended or adjusted under 35 U.S.C. 154(b) by 0 days.

(21) Appl. No.: 18/847,705

(22) PCT Filed: Mar. 22, 2023

(86) PCT No.: PCT/IL2023/050303
§ 371 (c)(1),
(2) Date: Sep. 17, 2024

(87) PCT Pub. No.: WO2023/199301
PCT Pub. Date: Oct. 19, 2023

(65) Prior Publication Data

US 2025/0195329 A1 Jun. 19, 2025

(30) Foreign Application Priority Data

Apr. 11, 2022 (IL) ........................................ 292151

(51) Int. Cl.
*B65D 25/08* (2006.01)
*A61J 1/03* (2023.01)
*A61J 7/04* (2006.01)

(52) U.S. Cl.
CPC ............ *A61J 1/035* (2013.01); *A61J 7/0436* (2015.05); *A61J 7/0472* (2013.01); *A61J 2205/20* (2013.01)

(58) Field of Classification Search
CPC ........ A61J 1/035; A61J 7/0436; A61J 7/0472; A61J 7/04; A61J 1/03; A61J 2205/20; B65D 2401/55; B65D 83/0445; B65D 81/3272; B65D 51/2835; B65D 25/08
USPC ........................................ 206/219, 222, 438
See application file for complete search history.

(56) References Cited

U.S. PATENT DOCUMENTS 5,370,222 A * 12/1994 Steigerwald ....... B65D 81/3211 215/DIG. 8
5,884,759 A * 3/1999 Gueret .............. B65D 51/2871 222/145.5
6,938,757 B2 9/2005 Eastman et al.
8,770,399 B2 * 7/2014 Hjalmarsson ...... B65D 51/2821 206/219
2019/0009963 A1 * 1/2019 Wessely .............. B65D 75/327

FOREIGN PATENT DOCUMENTS

DE 3028808 A1 6/1982

OTHER PUBLICATIONS

PCT/IL2023/050303 Written Opinion, Israel Patent Office, Jun. 21, 2023.

* cited by examiner

*Primary Examiner* — King M Chu
(74) *Attorney, Agent, or Firm* — AlphaPatent Associates Ltd.; Daniel J. Swirsky

(57) ABSTRACT

A pill's cell (10B), including: a first compartment (26C), for containing a pill (28): a second compartment (26A), for containing a first substance (20A); a third compartment (26B), for containing a second substance (20B); and a partition (54) for partitioning the second (26A) and third (26B) compartments, the partition (54) being breakable upon removing the pill (28) from the first compartment (26C), for mixing the first (20A) and second (20B) substances upon the pill removing.

5 Claims, 4 Drawing Sheets

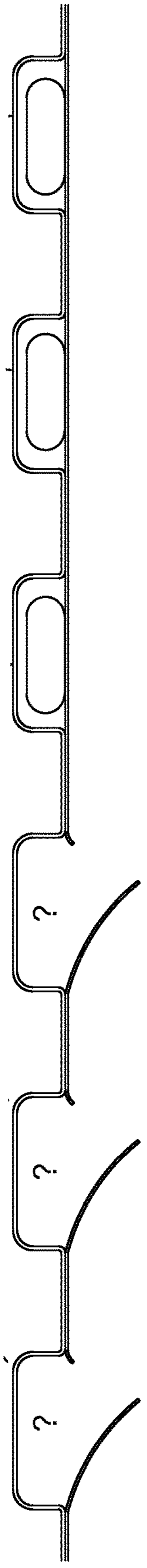
FIG 1 - PRIOR ART
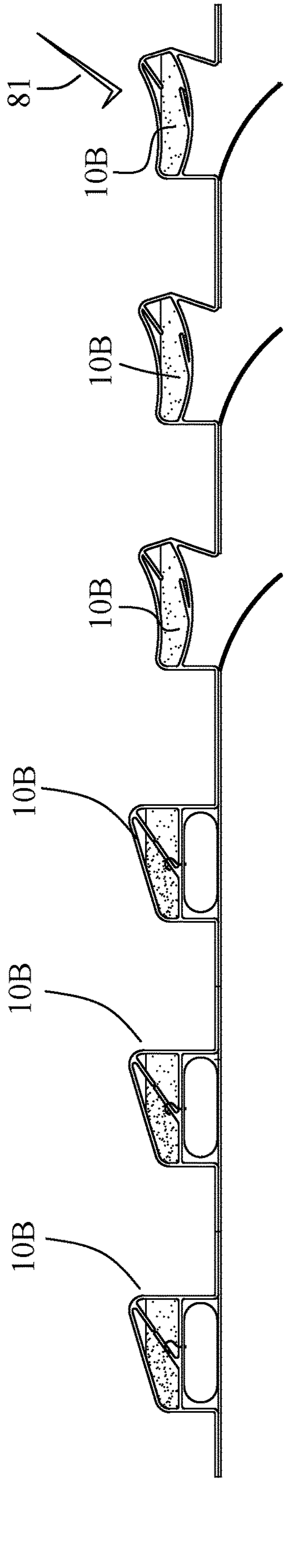
FIG 2

PILL'S CELL

TECHNICAL FIELD

The invention relates to the field of pills' packaging.

BACKGROUND

FIG. 1 depicts a prior art pills' package.

From a package including 6 cells, each containing a pill, the user presses each time one cell, for removing its pill.

However, the user may be doubted when was the latest removing of the pill.

There is a long felt need to provide a solution to the above-mentioned and other problems of the prior art.

SUMMARY

A pill's cell, including:

a first compartment, for containing a pill;

compartment for containing substances for being mixed.

BRIEF DESCRIPTION OF THE DRAWINGS

FIG. 1 depicts a prior art pills' package.

FIG. 2 depicts a pills' package according to one embodiment of the invention.

DETAILED DESCRIPTION

FIG. 2 depicts a pills' package according to one embodiment of the invention.

A pills' package 10A according to one embodiment includes for each pill's cell 10B, substances for indicating from the consumed cells, which (81) has been removed at the last 3 (example) hours, thus advising the user not consume another one.

Figure 3:
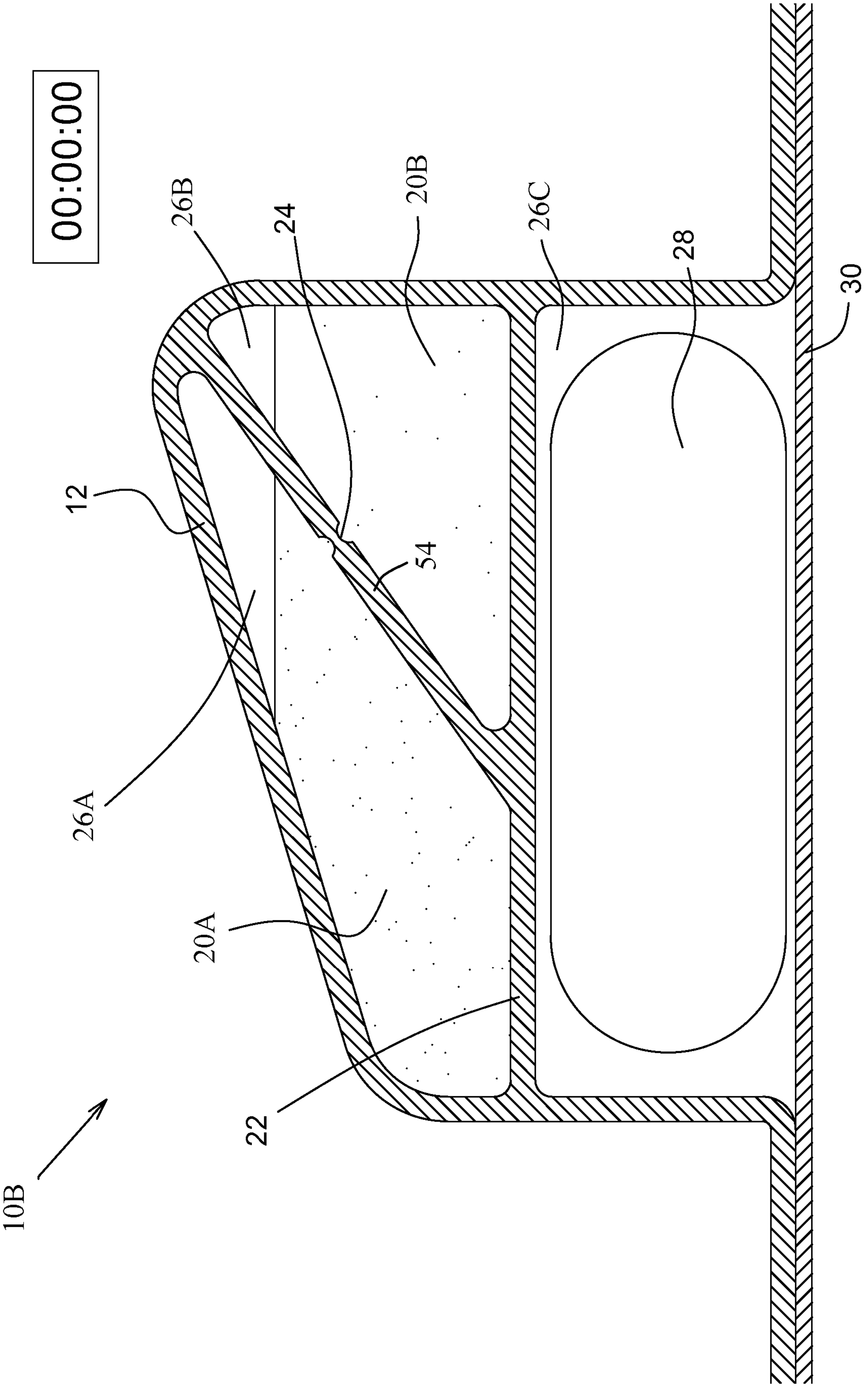
FIG. 3 depicts one of the pill's cells of FIG. 2 prior to removing the pill.

FIG. 3 depicts one of the pill's cells of FIG. 2 prior to removing the pill.

Pill's cell 10B includes a bottom compartment 26C and two top compartments namely 26A and 26B disposed above bottom compartment 26C and including a partition 54 therebetween.

Bottom compartment 26C houses a pill 28. The bottom of bottom compartment 26C includes as marketed, a reed 30, for being torn upon being pressed.

Top compartment 26A contains as marketed, a first substance 26A; and top compartment 26B contains as marketed, a second substance 26B.

Figure 4:
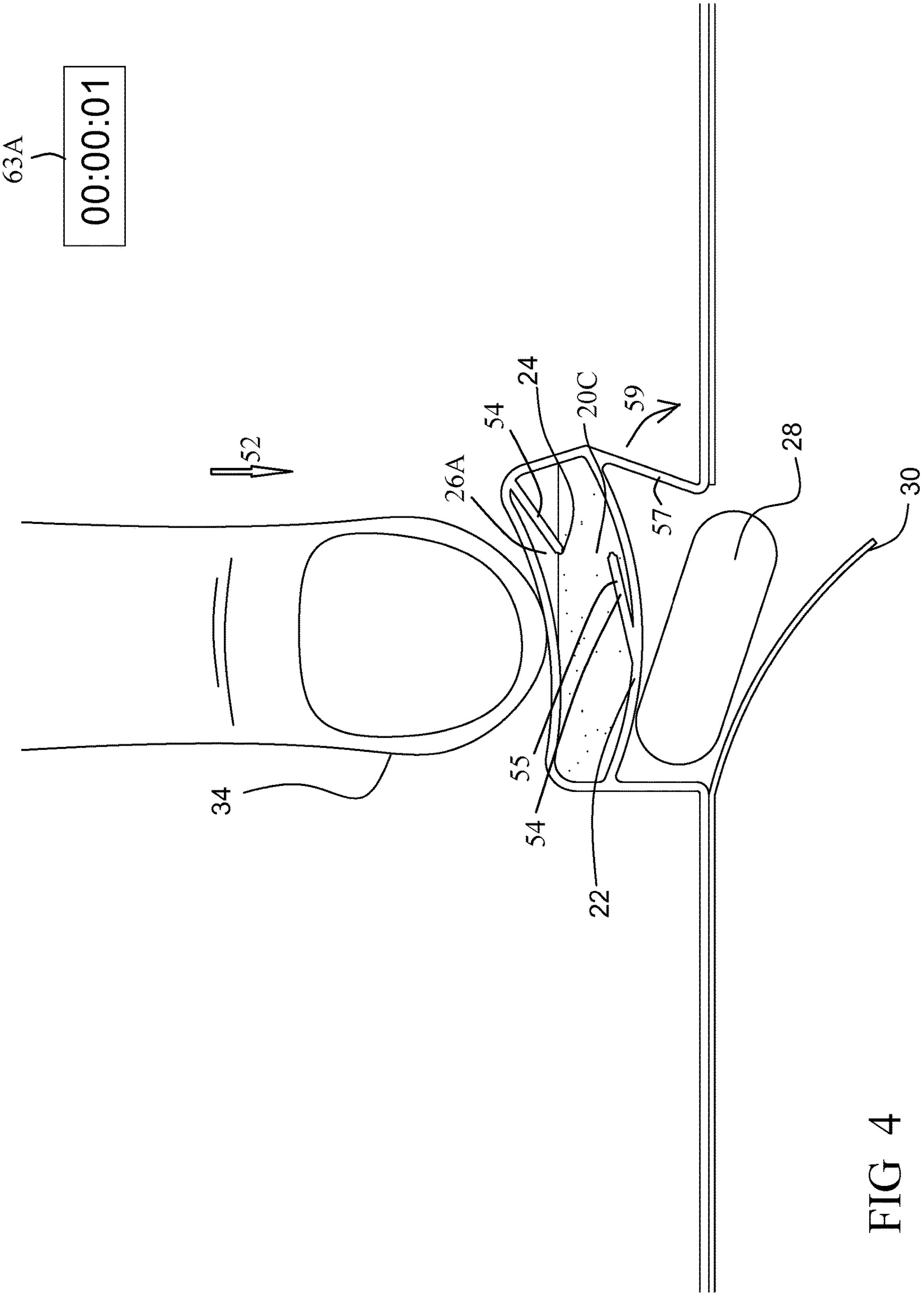
FIG. 4 depicts pill's cell of FIG. 3 upon being pressed.

FIG. 4 depicts pill's cell of FIG. 3 upon being pressed.

Pressing (52) top compartment 26A presses the bottom 22 of top compartment 26A on pill 28, which tears reed 30.

Pressing 52 further breaks partition 54, thus top compartments 26A and 26B merge to a single compartment, thus substances 20A and 20B of FIG. 3 mix one with the other to a third substance 20C having a third color.

Substances 20A and 20B of FIG. 3 are configured to change their color upon being mixed, to a pre-determined period, say 3 hours.

For example substance 20A may constitute a solution of water containing an indicative powder of green color plus 0.5% NaOH caustic soda (sodium hydroxide), causing the water to be a base of 8 pH; and substance 20B may constitute a solution of water including 0.5% of HCl (hydrochloric acid).

Figure 5:
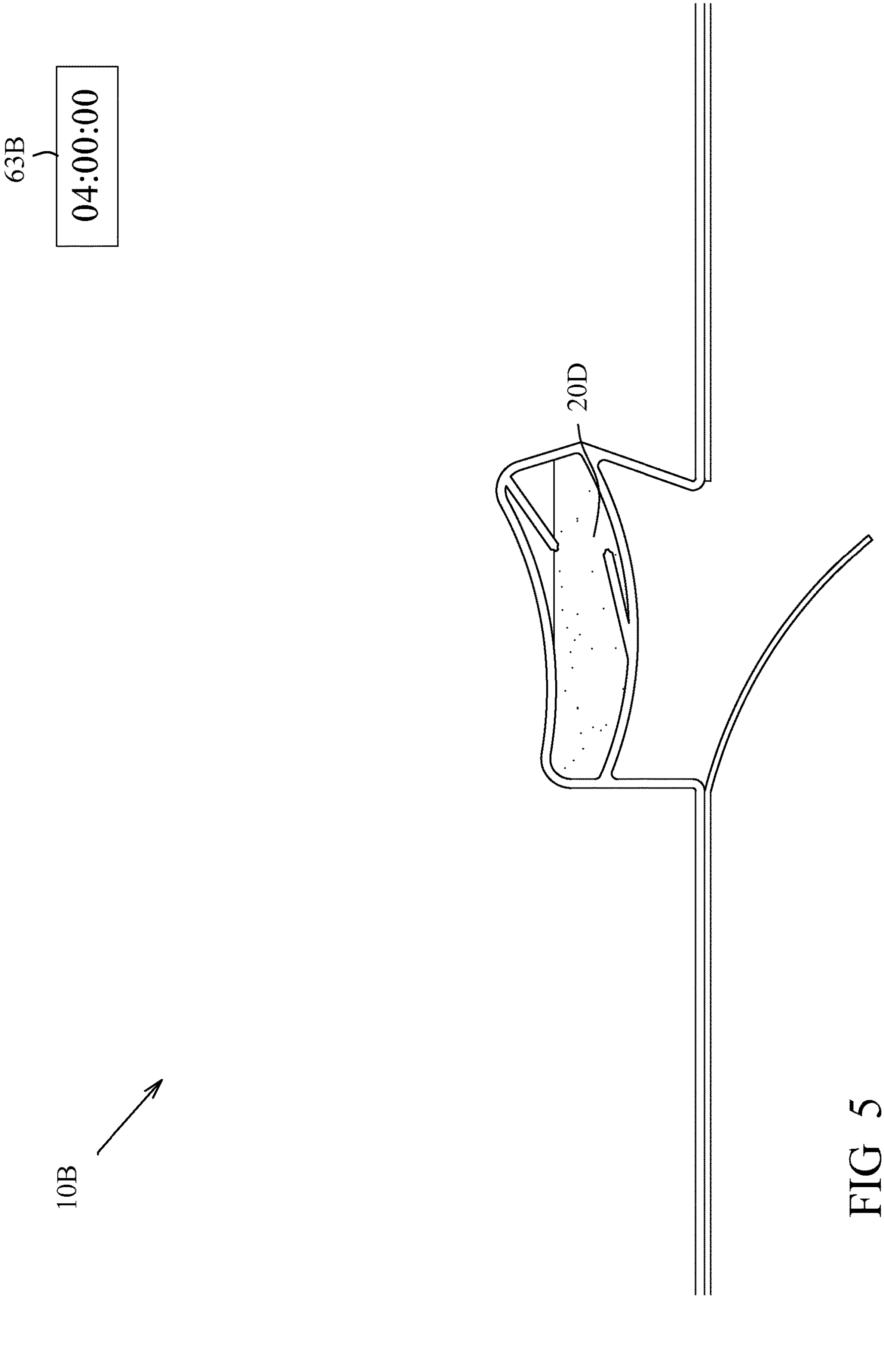
FIG. 5 depicts pill's cell of FIG. 3 several hours after removing the pill.

FIG. 5 depicts pill's cell of FIG. 3 several hours after removing the pill.

4 hours (example) after mixing substance 20A with 20B, mixed substance 20C of FIG. 4, turns to be a fourth substance 20D, having a fourth color.

Thus, even though pill 28 is already absent, the user is informed by the color of the mixture whether the pill has been consumed at the last 3 hours.

Referring again to FIG. 3, partition 54 may include a breaking line 24, for ensuring the breaking of partition 54.

Partition 54 preferably is tilted (FIG. 3), thereby pressing 52 (FIG. 4) rotates bottom portion 55 of partition 54 to be disposed horizontally, thereby improving the merging of top compartments 26A and 26B for increasing the mixing extent.

The Ceiling 12 of top compartment 26A is tilted and meets the top of tilted partition 54, thereby pressing 52 (FIG. 4) tilts (59) top compartments 26B and 26C, thereby improving the merging of top compartments 26A and 26B for increasing the mixing extent.

Tilting 59 of top compartments 26B and 26C is applied by bending of wall 57 of bottom compartment 26C.

Numeral 10A denotes the pills' package according to one embodiment of the invention, including a plurality of cells 10B;

10B: pill's cell;

12: ceiling of compartment 26A;

20A,20B: substances as marketed;

20C,20D: substances produced upon mixing substances 20A,20B;

22: bottom of top compartment 26A;

24: breaking line;

26A,26B,26C: compartments;

28: pill;

30: reed for covering pill 28;

34: user's finger;

52: pressing for removing pill 28;

54: breakable partition;

55: bottom portion of partition 54;

57: wall of bottom compartment 26C;

59: titling of top compartments 26B and 26C;

63A,63B: periods;

81: cell 10B been consumed not more than 3 (example) hours ago;

The reference numbers in the claims should not be interpreted as limiting the claims in any form.

What is claimed is:

1. A pill's cell (10B), comprising:

a first compartment (26C), for containing a pill (28);

a second compartment (26A), for containing a first substance (20A);

a third compartment (26B), for containing a second substance (20B), wherein said first (20A) and second substance (20B) are characterized to change colors thereof upon being mixed; and a partition (54) for partitioning said second (26A) and third (26B) compartments, said partition (54) being breakable upon removing said pill (28) from said first compartment (26C), for mixing said first (20A) and second (20B) substances upon said pill removing, wherein said second (26A) and third (26B) compartments are disposed aside one another and above said first compartment (26C), thereby removal of said pill (28) is applicable by pressing (52) on at least one of said second (26A) and third (26B) compartments, to presses thereof on said first compartment (26C), thereby said removal of said pill (28) ensures said breaking of said partition (54) between said second (26A) and third (26B) compartments.

2. The pill's cell (10B) according to claim 1, wherein said first (20A) and second (20B) substances are characterized in changing color to a first color after a first period (63A) after said mixing therebetween.

3. The pill's cell (10B) according to claim 1, wherein said first (20A) and second (20B) substances are characterized in changing color to a second color after a second period (63B) after said mixing therebetween.

4. The pill's cell (10B) according to claim 1, wherein said partition (54) is tilted in relation to a bottom (30) of said first compartment (26C).

5. The pill's cell (10B) according to claim 1, wherein a ceiling (12) of at least one of said first (26A) and second (26B) compartments is tilted in relation to a bottom (30) of said first compartment (26C).

* * * * *